United States Patent Office 2,875,514
Patented Mar. 3, 1959

2,875,514

COMPOSITION OF MATTER AND METHOD OF USING SAME IN SOLDERING ALUMINUM

Richard L. Doerr, Niagara Falls, N. Y., assignor to Olin Mathieson Chemical Corporation, a corporation of Virginia No Drawing. Application December 31, 1951
Serial No. 264,354

14 Claims. (Cl. 29—487)

My invention relates to improved reaction flux compositions having special value in soldering operations involving aluminum.

Aluminum fabrication has been handicapped by the absence of a commercially satisfactory fluxing material for the accepted solders, such as zinc or zinc containing combinations, for example zinc cadmium or zinc tin solders. For example, organic amines and amine derivatives have been proposed as fluxing materials, but the joints resulting from the soldering operations lack adequate bond strength and indeed in many instances the solder may be peeled physically from the metal surface. Various reaction type fluxes have been proposed, but these materials accentuate corrosion difficulties by requiring the introduction of extraneous metals which give rise to electrolytic corrosion between the solder and the base metal. Also the fluxing compositions that have been proposed to date, in general, require special procedures of application and create difficulties in removal of residues after soldering.

I have found that a reaction flux comprising a triple mixture of stannous chloride, zinc dihydrazine chloride and a hydrazine monohydrohalide has good fluxing action in aluminum soldering. Unfortunately, however, the mixture must be prepared as a viscous aqueous solution containing less than about 10 percent water which makes it exceedingly difficult to apply in production soldering operations. I have discovered however that a reaction flux comprising a reaction product of a lower aliphatic ketone, particularly acetone, in combination with stannous chloride, zinc chloride or zinc dihydrazine chloride, and a hydrazine monohydrohalide can be produced by simply mixing the materials of the reaction and removing excess ketone and the water of reaction under controlled conditions. I have found that the reaction flux composition so produced has special advantages in soldering aluminum. The compositions are viscous liquids which may be readily diluted with acetone or methanol or similar solvent for application by spraying, painting, dipping and the like to the aluminum surface to be soldered. The seams and joints resulting from the soldering operation employing my reaction flux compositions have excellent bond strength, usually exceeding the tensile strength of the aluminum sheet. The compositions under soldering conditions are characterized by excellent fluidity and spread action, penetrating the aluminum oxide film in a manner promoting its removal, apparently by mechanical action so that a film of tin-zinc alloy adheres to the aluminum surface. For many purposes, e. g. joining the strands of aluminum cables, it is unnecessary to use additional solder metal.

The compositions of my invention are liquid products containing a combination of stannous chloride, zinc chloride or zinc dihydrazine chloride and a hydrazine monohydrohalide such as the monohydrochloride or monohydrobromide reacted with at least the stoichiometric quantity of ketone to react with all of the hydrazine in the mixture. I prefer to employ zinc dihydrazine chloride in the composition since it is non-hygroscopic and since it adds reactivity during the decomposition reaction accompanyng soldering compared to zinc chloride and thus assists penetration and fluxing of the aluminum oxide film. I prefer to employ acetone as the ketone reactant although other lower aliphatic ketones such as methyl ethyl ketone, diethyl ketone, diacetone alcohol and the like have value. The higher ketones are less satisfactory and are particularly undesirable from the standpoint of leaving difficult-to-remove carbonaceous flux residues. The proportions of ingredients do not appear to be particularly critical, but I have found that about 30 to 80 percent stannous chloride, 10 to 50 percent zinc dihydrazine chloride and about 5 to 50 percent hydrazine hydrohalide by weight of the total composition are useful. An excellent composition is represented by 70 percent stannous chloride, 10 percent zinc dihydrazine chloride and 20 percent hydrazine hydrochloride reacted with sufficient acetone to convert all of the hydrazine present to the hydrazone form.

The new compositions are readily prepared either by premixing the dry components and adding the mixture to the ketone or by separately adding each of the dry components to the ketone. The reaction occurs spontaneously with evolution of heat. The reaction mixture then is heated slowly with agitation to drive off excess ketone and the water of reaction. During this operation the temperature should be limited to a temperature below 200° C., and a temperature of about 160° to 170° C. is preferable. The reaction product is an opaque viscous liquid or solution in which a slight precipitate may form. The precipitate may be removed by filtration although this is unnecessary, or it may be redispersed by agitation. Upon standing the product takes on an orangelike color after a period of several days. In application my invention provides an improvement in aluminum soldering which comprises applying an acetone solution of the dehydrated reaction product of the lower aliphatic ketone with the stannous chloride, the zinc dihydrazine chloride and the hydrazine hydrohalide. The solution of the reaction flux composition should be of at least 50 percent concentration by volume or coagulation tends to occur. The solution should be substantially water free for the soldering operation. The solution as noted above may be applied to the aluminum surface in the usual manner as by spraying, painting, dipping or the like. During the soldering operation the temperature and time should be controlled to avoid excessive charring and formation of carbonaceous residues. For example, the temperature should not exceed about 420° C. and the time should be limited to about 1 to 2 minutes at this temperature. Since the reaction flux composition is flammable, flame soldering is not feasible. When the soldering operation is completed, the flux residue is removed by washing with hot water. The manner of preparation and the fluxing action of my reaction flux compositions is illustrated by the following examples:

Example I

Stannous chloride (70 grams), zinc dihydrazine chloride (10 grams), hydrazine monohydrochloride (20 grams) were pulverized and the powdered mixture was placed in a beaker. 50 cc. of acetone was added and the occurrence of reaction was observed visually. The reaction mixture was heated on a hot plate until boiling commenced and boiling was continued until a temperature of 160° to 170° C. was reached. The solution was allowed to cool to room temperature to obtain an opaque viscous fluid.

The flux action of the product was tested by placing a small piece of metal solder (60% zinc-40% cadmium) on a small section of aluminum plate. A small amount of the flux solution was added and the plate was heated on a hot plate to approximately 390° C. to 400° C. Upon cooling, the flux residue was removed by hot water washing. By visual observation the spread action and the resulting bond strength were judged to be excellent.

By contrast the reaction product of zinc dihydrazine chloride and acetone gave relatively poor fluxing performance. The residue after soldering was not charred but was very hard to remove.

*Example II*

A reaction flux solution was prepared by boiling 2100 grams of stannous chloride, 300 grams of zinc dihydrazine chloride, 600 grams of hydrazine hydrochloride and 1500 cc. of acetone until a temperature of 165° C. was obtained. The solution was cooled and 600 cc. of acetone was added to thin the solution to a viscosity suitable for soldering. Tested in a similar manner to the flux solution of Example I, the composition proved easy to apply, showed powerful fluxing action under soldering conditions and produced a metal film having a bond strength greater than the aluminum test sheet (0.005" thick). The flux residue was easy to remove and only a trace of carbon remained after hot water washing.

The corresponding compositions substituting hydrazine monohydrobromide for the monohydrochloride or zinc chloride for the zinc dihydrazine chloride or other ketone for the acetone employed in the above examples are prepared in similar fashion by simple substitution of ingredients.

I claim:

1. A liquid composition suitable for use as a flux in the soldering of aluminum essentially comprising the reaction product of a lower alkyl ketone, stannous chloride, a zinc halide which is a member of the class consisting of zinc chloride and zinc dihydrazine chloride and a hydrazine hydrohalide.

2. A liquid composition suitable for use as a flux in the soldering of aluminum essentially comprising the reaction product of acetone, stannous chloride, a zinc halide which is a member of the class consisting of zinc chloride and zinc dihydrazine chloride and a hydrazine hydrohalide.

3. A liquid composition suitable for use as a flux in the soldering of aluminum essentially comprising the reaction product of acetone, stannous chloride, zinc dihydrazine chloride and a hydrazine hydrohalide.

4. A liquid composition suitable for use as a flux in the soldering of aluminum essentially comprising the reaction product of acetone, stannous chloride, zinc dihydrazine chloride and hydrazine hydrochloride.

5. A liquid composition suitable for use as a flux in the soldering of aluminum essentially comprising the reaction product of acetone, stannous chloride, zinc dihydrazine chloride and hydrazine hydrobromide.

6. In the soldering of aluminum, the method which comprises applying a water free liquid composition which comprises essentially the reaction product of a lower alkyl ketone, stannous chloride, a zinc halide which is a member of the class consisting of zinc chloride and zinc dihydrazine chloride and a hydrazine hydrohalide to the aluminum surface, controlling the soldering temperature and time to prevent charring and removing flux residue by washing with hot water.

7. In the soldering of aluminum, the method which comprises applying a water free liquid composition which comprises essentially the reaction product of acetone, stannous chloride, a zinc halide which is a member of the class consisting of zinc chloride and zinc dihydrazine chloride and a hydrazine hydrohalide to the aluminum surface, controlling the soldering temperature and time to prevent charring and removing flux residue by washing with hot water.

8. In the soldering of aluminum, the method which comprises applying a water free liquid composition which comprises essentially the reaction product of acetone, stannous chloride, zinc dihydrazine chloride and a hydrazine hydrohalide to the aluminum surface, controlling the soldering temperature and time to prevent charring and removing flux residue by washing with hot water.

9. In the soldering of aluminum, the method which comprises applying a water free liquid composition which comprises essentially the reaction product of acetone, stannous chloride, zinc dihydrazine chloride and hydrazine hydrochloride to the aluminum surface, controlling the soldering temperature and time to prevent charring and removing flux residue by washing with hot water.

10. In the soldering of aluminum, the method which comprises applying a water free liquid composition which comprises essentially the reaction product of acetone, stannous chloride, zinc dihydrazine chloride and hydrazine hydrobromide to the aluminum surface, controlling the soldering temperature and time to prevent charring and removing flux residue by washing with hot water.

11. A composition according to claim 1 in which said reaction product is one prepared from 30 to 80 percent stannous chloride, 10 to 50 percent of said zinc halide, 5 to 50 percent hydrazine hydrohalide and said ketone in amount at least sufficient to react with all of the hydrazine components.

12. A composition according to claim 4 in which said reaction product is one prepared from 30 to 80 percent stannous chloride, 10 to 50 percent zinc dihydrazine chloride, 5 to 50 percent hydrazine hydrochloride and acetone in amount at least sufficient to react with all of the hydrazine component.

13. In the soldering of aluminum, the step of applying to the metals to be joined a liquid composition comprising essentially the reaction product of a lower alkyl ketone, stannous chloride, a zinc halide which is a member of the class consisting of zinc chloride and zinc dihydrazine chloride and a hydrazine hydrohalide.

14. In the soldering of aluminum, the step of applying to the metals to be joined a liquid composition comprising essentially the reaction product of acetone, stannous chloride, zinc dihydrazine chloride and hydrazine hydrochloride, said reaction product being one prepared from 30 to 80 percent stannous chloride, 10 to 50 percent zinc dihydrazine chloride, 5 to 50 percent hydrazine hydrochloride and acetone in amount at least sufficient to react with all of the hydrazine component.

References Cited in the file of this patent

UNITED STATES PATENTS

| | | |
|---|---|---|
| 2,172,979 | Kohler | Sept. 12, 1939 |
| 2,266,060 | Miller | Dec. 16, 1941 |
| 2,640,793 | Doerr | June 2, 1953 |

FOREIGN PATENTS

| | | |
|---|---|---|
| 599,805 | Great Britain | Mar. 22, 1948 |
| 607,935 | Great Britain | Sept. 7, 1948 |